No. 813,382. PATENTED FEB. 20, 1906.
I. HODGSON.
VEHICLE WHEEL RIM.
APPLICATION FILED JUNE 6, 1905.
2 SHEETS—SHEET 1.
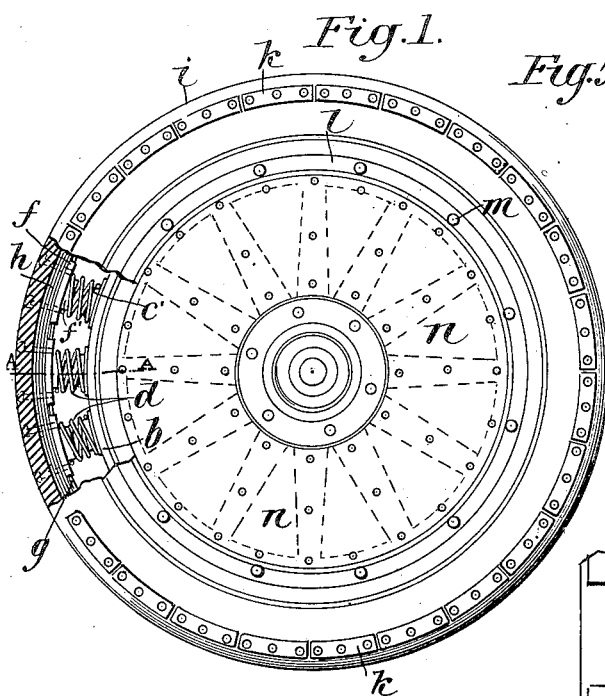
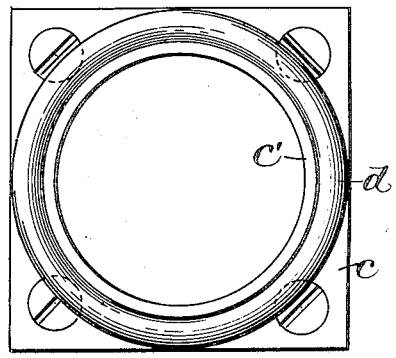
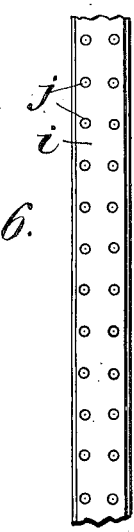
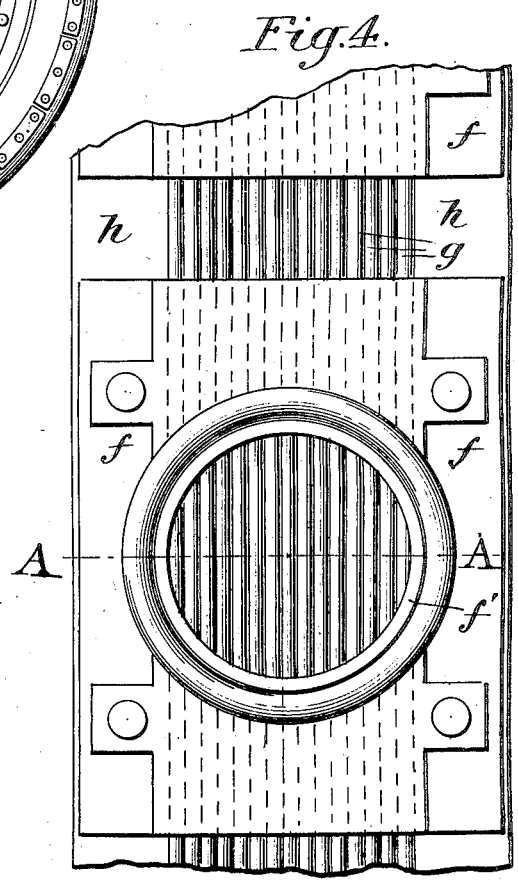
Witnesses:
Edgar J. Hodgson.
Ruth M. Dolberg.
Inventor.
Isaac Hodgson.

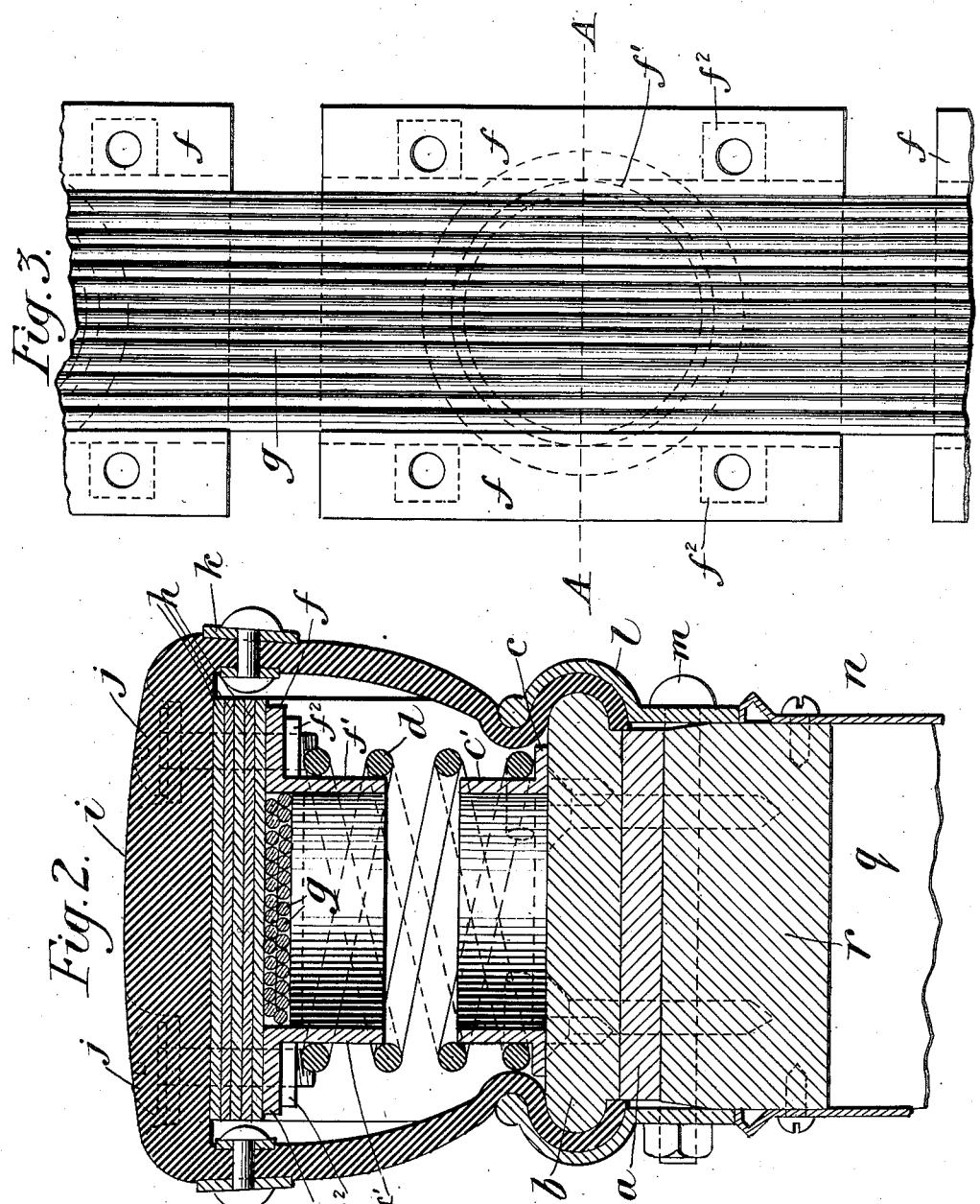

UNITED STATES PATENT OFFICE.

ISAAC HODGSON, OF MINNEAPOLIS, MINNESOTA, ASSIGNOR TO THE AUTOMOBILE WHEEL AND RIM COMPANY OF NEW JERSEY.

VEHICLE-WHEEL RIM.

No. 813,382.  Specification of Letters Patent.  Patented Feb. 20, 1906.

Application filed June 6, 1905. Serial No. 263,982.

*To all whom it may concern:*

Be it known that I, ISAAC HODGSON, a citizen of the United States, residing at Minneapolis, in the county of Hennepin and State of Minnesota, have invented certain new and useful Improvements in Vehicle-Wheel Rims, frequently designated "Tires;" and I do hereby declare the following to be a full, clear, and exact description of the invention, such as will enable others skilled in the art to which it belongs to make and use the same.

The object of my invention is to provide a simple, secure, and efficient elastic rim for wheels of vehicles, especially adapted for application to automobiles, or what are frequently designated as "horseless carriages;" and to this end it consists of the novel devices and combination of devices hereinafter described, and defined in the claims.

The invention is illustrated in the accompanying drawings, wherein similar characters represent similar parts throughout the several views.

Figure 1 is a view in elevation of the wheel with a part of the rim-cover broken away and showing the helical springs and other parts of said rim, hereinafter described, in proper position on the body of the wheel. Fig. 2 is an enlarged section on line A A, Fig. 1, Fig. 3, and Fig. 4, Figs. 3 and 4 being also enlarged. Fig. 3 is a plan view of the reel-plates, $f$, $f'$, (plunger,) and $f^2$ (boss) being component parts thereof, showing the wire wrapping $g$ in the channels of the plates $f$, which constitute the reel as it appears after the cover $i$ and padding $h$ are removed, also showing the position of the helical springs $d$ and plungers $f'$ in dotted lines below. Fig. 4 is an inverted view of one of the plungers $f'$ and reel-plates of same, with spring in position and showing a part of annular pad $h$ and wire wrapping above. Fig. 5 is a plan of one of the base-plates $c$, showing spring in proper position. Fig. 6 is a developed view of a part of the face or tread of the wheel-cover $i$, showing the bolt-heads $j$ in position to a small scale, same as that of Fig. 1.

The body of the wheel to be of suitable wood or other material, constructed in the usual way and provided with a good steel tire $a$, upon which shall be secured a band $b$, of suitable material, preferably hickory, bent and molded to proper form, and upon said band $b$ shall be constructed the elastic portion of said rim, consisting of several parts, hereinbefore and hereinafter designated. To secure said parts in proper operating position, first secure the base-plates $c$ to the wooden band $b$, then slip the springs $d$ over the circular stub-shafts $c$, which are component parts of $c$, and place or drop the plungers $f'$ in the springs $d$. Now before wrapping or reeling on the wire cables $g$ the springs $d$ must be compressed at least one-quarter of an inch, so that when the said cable-wrapping is properly done the wires or cables will be in strong tension, thus securely uniting the said reel-plates in a flexible reel-covering and engaging said springs $d$ and base-plates $c$, which are respectively in numbers of equal plurality. Said reel-cables $g$ shall at their extreme ends be securely anchored to the reel-plates $f$.

The base-plates $c$ and the reel-plates $f$ may be of malleable iron or steel, preferably the latter, drop-forged, and shall be properly formed and fitted in every part to the true circular curves of the wheel. The springs $d$ shall be of suitable material, preferably steel, properly and equally tempered for the purpose. Covering said reel-plates $f$ and cable-wrapping $g$ heavy textile fabric $h$ shall be securely reeled on, thus forming a strong annular flexible pad beneath the cover $i$. (See Figs. 2 and 4.) Said cover $i$ shall be composed of strong textile fabric in rubber, heavy on the tread, so as to be waterproof. The sides of the said cover $i$ near to the line of tread may be protected by short sections $k$, of sheet-brass armor, properly and securely riveted, having metal washers on the inside. (See Figs. 1 and 2.) Said cover $i$ shall be pressed down hard upon the pad $h$, securely bolted at $j$ to the bosses $f^2$ of the reel-plates $f$. The bolts $j$ shall be provided with sole-leather and metal washers, the former next to the cover $i$ and the latter, of smaller size, under the heads of said bolts. The open edges of said cover $i$ shall then be drawn down to the band $b$, tacked thereto, and secured in position by the annular metal, preferably brass, clamps $l$, bolted at $m$.

To protect the spokes $q$ of the wheels from mud and dirt and to prevent them from, fan-like, causing a dust nuisance, they shall be covered with sheet-metal disks $n$, preferably brass, secured to the felly $r$ and spokes $q$ and made waterproof.

Inasmuch as two springs of each wheel-rim will be always in action (compression) and must sustain one-fourth of the load, including one-fourth of the weight of the vehicle, therefore eight springs, two in each rim, will and shall sustain the entire load with a slight depression not to exceed three-sixteenths of an inch when not in motion. Hence in this simple way the necessary strength of the springs for any known load can be readily ascertained. Single or double helical springs may be used, preferably the latter.

I am aware that prior to my invention vehicle-wheels with elastic tires have been made and used. Therefore I do not claim such a combination broadly; but What I do claim as my invention, and desire to secure by Letters Patent of the United States, is as follows:

1. An elastic rim combining a plurality of channeled plates $f$ flexibly united by cables $g$, the pad $h$, springs $d$, engaging said channeled plates $f$, and the base-plates $c$, the latter being secured to the band $b$, substantially as and for the purposes set forth.

2. An elastic rim combining a suitable cover $i$, secured to the reel-plates $f$, by the bolts $j$, its open edges being secured to the band $b$, by the annular clamps $l$, substantially as shown and described.

In testimony whereof I affix my signature in the presence of two witnesses.

ISAAC HODGSON

Witnesses:
  EDGAR J. HODGSON,
  RUTH M. SOLBERG.